3,003,848
HEMOGLOBIN AS AN AID IN URANIUM LEACHING
John C. Hillyer, Bartlesville, Okla., assignor to Phillips Petroleum Company, a corporation of Delaware
Filed Sept. 14, 1959, Ser. No. 839,885
17 Claims. (Cl. 23—14.5)

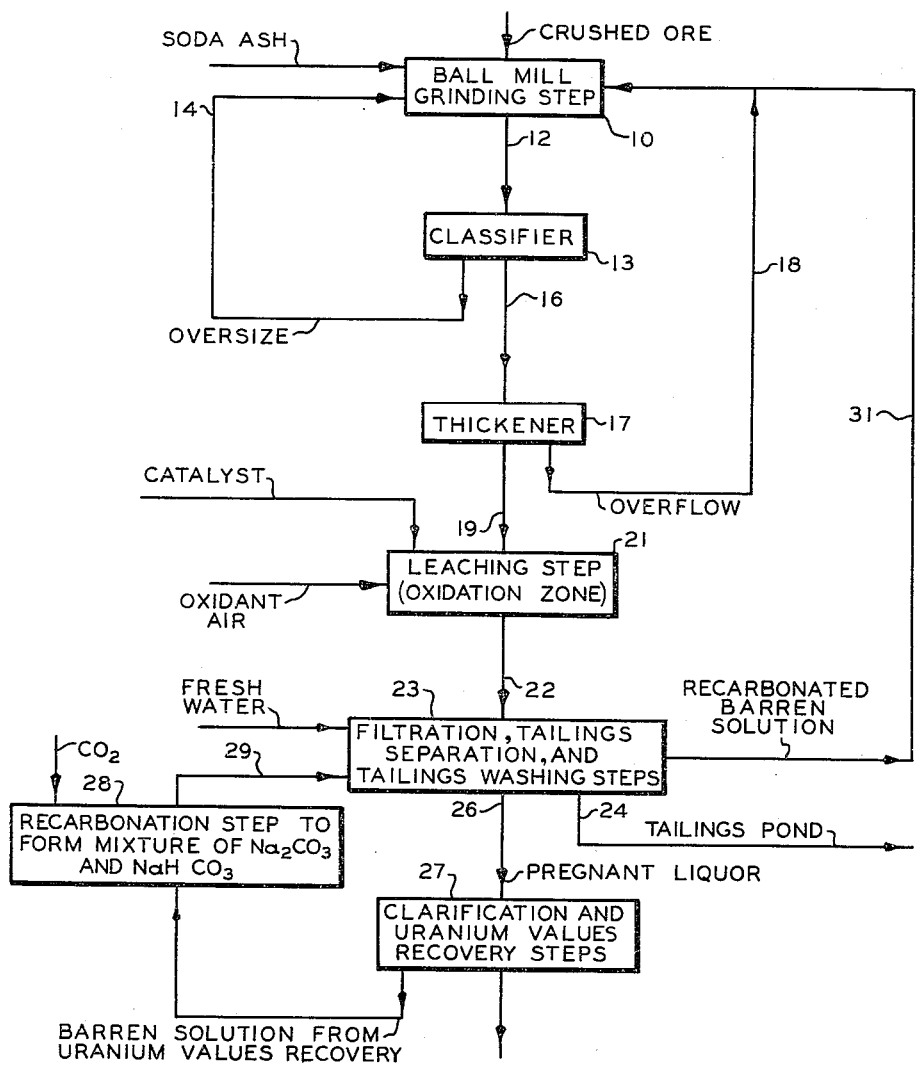

This invention relates to a process for increasing and accelerating the recovery of uranium values from ore. In one specific aspect it relates to increasing the ultimate extraction and accelerating the rate of leaching out of uranium from its ores by contacting said ores with carbonate leach solution containing a finite amount of hemoglobin.

One of the processes for concentrating uranium values from its ores involves preparing an ore slurry in the presence of a basic carbonate solution and passing air therethrough, whereby a part of the ore is converted to a water-soluble compound forming, what is termed in the art, a pregnant liquor. The inert solids are disposed of, and the uranium values are recovered from the pregnant liquor by any one of several methods.

In regard to dissolution of uranium from uranium-containing minerals, very few kinetic studies have been made that prove any quantitative relationship between the rate of solution and the variables controlling the rate. In practice, the alternative methods of accelerating the leaching rate are: (1) the use of supplementary oxidants, such as potassium permanganate; (2) atmospheric air oxidation in the presence of catalysts, and (3) use of pressure equipment; such as autoclaves.

In the second-named method, Pachuca tanks are the vessels used to leach the uranium ore pulp with residence times ranging up to 150 hours. This longest retention period is several times that required to obtain the same degree of uranium extraction that can be obtained in the autoclaves, and has encouraged use of the latter type equipment. However, it has been found that the use of a properly selected catalyst is an efficient and economical means of increasing the rate of oxidation at atmospheric and superatmospheric pressure.

I have discovered that leaching of uranium-containing ores, in which the uranium is in a subhexavalent state, can be effected at an appreciable faster rate, by contacting said ores with oxygen in the presence of carbonate leach solution containing a finite amount of hemoglobin in the leaching vessel. Simultaneously, a significant increase in carbonate leach process plant recoveries of uranium values from the ore is achieved. Thus, the throughput of the Pachuca tanks oxidation step is increased substantially and a somewhat higher ultimate leaching of uranium values is attained, with the expenditure of less time and power. The net result is to raise the effective capacity of a given Pachuca tank as much as 50 percent. From another standpoint, less leaching equipment is necessary per ton of ore oxidized in the Pachuca tanks, or for a given amount of ore to be processed in a prescribed period. Comparable improvement can be achieved where the leaching equipment is autoclaves.

It is, therefore, an object of this invention to provide a new process for leaching uranium ores with a carbonate solution. It is also an object of this invention to provide a uranium leaching process which effects a faster rate of dissolution of uranium compounds and a higher ultimate recovery of said compounds than possible heretofore in oxidation at atmospheric pressure. It is a further object to provide a new agent for aiding the oxidation of tetravalent uranium compounds to soluble hexavalent uranium compounds at atmospheric and superatmospheric pressure. Other objects, as well as aspects and advantages inherent in the process,, will become apparent upon studying the accompanying disclosure and drawing.

The well known carbonate leach process has been adapted to the processing of uranium ores to extract uranium values. This process, with modifications, is described in application Serial No. 751,256, filed July 28, 1958. This invention briefly comprises wet grinding the crushed ore in the presence of sodium carbonate and sodium bicarbonate, leaching a resulting ore slurry containing about 50 percent solids to convert the uranium values to the soluble sodium uranyl tricarbonate complex, filtering the resulting pregnant liquor slurry containing uranium values to remove inert solids therefrom, clarifying the filtrate (pregnant liquor), and recovering uranium therefrom, usually by precipitating as sodium diuranate by adding sodium hydroxide. Then follows the thickening, filtering, washing and drying of this yellow cake precipitate. The overflow from the yellow cake thickener is recycled to the process after first being recarbonated. Other methods may be employed for recovering the uranium values from the pregnant liquor by one of several methods such as, for example, ion exchange and solvent extraction.

This invention will be understood with the following description of the process diagram shown in the accompanying drawing. This drawing is, of course, a simplification, with only limited indications being given of the types of equipment and their method of operation. Conventional apparatus can be employed, however, for the unspecified process equipment.

Beginning at the top of the diagram, crushed, uranium-bearing ore and soda ash are introduced to the ball mill grinding zone 10 wherein the ore is ground to a fine condition in the presence of water, sodium carbonate (soda ash) and sodium bicarbonate. An ore slurry leaves the ball mill and passes on to line 12 through classifier 13 where oversized particles are returned to the ball mill 10 via conduit 14, and the remaining fine ore slurry passes through line 16 to a thickener 17. From the thickener, overflow is returned via conduit 18 to the grinding step, while the thickened slurry goes through conduit 19 to the leaching equipment 21 wherein the oxidation and dissolution take place. The slurry is contacted with oxygen by passing air therethrough, and maintained at a predetermined temperature for a period of time to cause the uranium values to go into solution as the sodium uranyl tricarbonate complex, forming what is termed in the art, the pregnant liquor. At this point, a small but oxidation accelerating amount of a catalyst selected from the group consisting of hemoglobin, dried blood, and dried blood with certain serums removed, is added to the feed to the oxidation zone 21, preferably in an amount ranging from 0.5 to 5.0 pounds per ton of dry comminuted ore.

The pregnant liquor leaves the oxidation zone 21 through conduit 22 and enters the vacuum drum filtration zone 23 wherein said liquor is filtered to remove the inert solids, usually called tailings. These tailings are washed and sent to a tailings pond in conduit 24. The filtrate, still the pregnant liquor, moves on through line 26 to a series 27 of steps including clarification, precipitation or other recovery means, thickening, washing and drying. Barren solution from these final steps is recarbonated with $CO_2$ in zone 28 and recycled through line 29 to zone 23. The recarbonated barren solution, after it has been used to wash the tailings in zone 23, is recycled through line 31 to grinding zone 10.

Examples of catalysts suitable for use as catalysts in the oxidation zone 21 are hemoglobin, dried blood, and dried blood with certain serums removed. Hemoglobin, the catalytic agent, is a conjugated protein made of heme, a complex of protoporphyrin and ferrous iron combined, in a tetracovalent state, with globin, a water-soluble, slightly basic protein, in the proportion of one part of heme, molecular weight 616, to 26 parts of globin. As a source of hemoglobin, the hemoglobin containing blood of any animal is satisfactory, but the blood of commercially slaughtered domesticated mammals, including cattle, sheep, hogs, horses and goats, is preferred because of the greater amounts available.

The leaching process of this invention can be carried out either in vessels operating at atmospheric pressure, such as Pachuca tanks, or vessels, operating at superatmospheric pressures, such as autoclaves. The temperature of the mixture in the Pachuca tanks should be maintained between 80 and 100° C., and the residence time will generally be between 45 and 70 hours. Where leaching takes place in autoclaves, operating temperatures between 100 and 135° C. are maintained and residence times under 20 hours are employed. Prior to charging the ore to the process, the ore should be ground at least as fine as 40 mesh, preferably to at least 60 mesh (all material passing through screen mesh size indicated). The mixture in the leach vessel can contain from 5 to 65 percent by weight ore, the remainder being carbonate leach solution containing from 40 to 60 grams per liter of sodium carbonate and 10 to 20 grams per liter of sodium bicarbonate. The air which is passed into the leach vessels should be at a rate of at least 0.5 liter per hour per kilogram of ore, preferably above 1.0, and generally not greater than 5.0 on the same basis. It is also within the scope of this invention to employ oxygen, ozone and the like in place of, or in addition to the air, in which case the air rate can be reduced by a proportionate amount.

Following the leaching step, the undissolved solids, or tailings, can be separated from the pregnant liquor containing dissolved uranium values, by filtration, flocculation or the like. The filtered liquor, containing dissolved uranium values, can then be treated to recover the uranium by such means as extraction, ion exchange, and precipitation. The most common procedure for recovering uranium values from carbonate leach solution is to add an excess of sodium hydroxide to cause the uranium values to be precipitated as sodium diuranate.

Some examples of ores currently being processed are uraninite, coffinite, carnotite, and the like.

The following specific examples are intended to illustrate the improvements which can be realized by operating according to the above description. However, it is to be understood that the invention is not limited to the particular embodiments shown in these examples.

EXAMPLE I

A set of runs were carried out in which samples of coffinite ore of 0.49 percent by weight $U_3O_8$ were leached in a carbonate leach process either with or without hemoglobin.

In these runs, the ore, the leach solution, and the hemoglobin, if any was used, were charged to a flask fitted with a stirrer, heater and an air inlet tube. The leach solution contained 50 grams/liter of $Na_2CO_3$ and 15 grams/liter of $NaHCO_3$. The percentage of solids (ore) in the mixture was 50 percent by weight. The air rate during the leach was 1.31 liter per hour per kilogram of ore while the temperature was 90° C. The ore was ground to a fineness which allowed all to pass through a 48 mesh screen and 21.5 percent through a 200 mesh screen.

During leaching, samples were intermittently drawn off and filtered to remove solids. The $U_3O_8$ content of the filtrate was then determined by X-ray spectroscopy. The results of these runs are expressed below as Table I.

Table I

| Run No. | Additive | Percent Extraction | | | | | |
|---|---|---|---|---|---|---|---|
| | | 1 hr. | 2 hr. | 7 hr. | 18 hr. | 42 hr. | 66 hr. |
| 1 | None | 36.24 | 42.70 | 60.35 | 76.27 | 86.19 | 96.12 |
| 2 | 2 lbs./Ton of Hemoglobin.[1] | 43.33 | 57.68 | 79.49 | 92.37 | 96.32 | 98.37 |

[1] Fisher Scientific Co., Hemoglobin from Cattle.

It can be seen from the above runs that the hemoglobin causes an increase in the rate of leaching and also brings about a more complete extraction at 66 hours. In fact, the percentage extraction at 42 hours with hemoglobin was above the 66 hours extraction of the run without hemoglobin.

EXAMPLE II

Two other leaching runs were carried out in which uranium-containing ores were leached by carbonate leach liquor either with or without hemoglobin.

In these runs, the uranium ore contained 0.48 weight percent $U_3O_8$, and the ore was ground to a fineness that allowed 100 percent to pass through a 48 mesh screen and 51.83 percent through a 200 mesh screen. All other variables were the same as in Example I. The results of these runs are expressed below as Table II.

Table II

| Run No. | Additive | Percent Extraction at 66 Hours |
|---|---|---|
| 3 | None | 92.92 |
| 4 | 2 lbs./Ton of Hemoglobin [1] | 95.63 |

[1] Identical to Example I.

As will be evident to those skilled in the art, various modifications of this invention can be made or followed in the light of the foregoing disclosure and discussion without departing from the spirit and scope of the disclosure or from the scope of the claims.

I claim:

1. In a process for the oxidation of tetravalent uranium to hexavalent uranium which comprises oxidizing an aqueous slurry of comminuted uranium-containing ore in the presence of sodium carbonate and sodium bicarbonate, forming a pregnant liquor containing dissolved sodium uranyl tricarbonate complex, and recovering uranium values from the pregnant liquor, the improvement which comprises the addition of a small but oxidation accelerating amount of a catalyst selected from the group consisting of hemoglobin, hemoglobin containing dried blood, and hemoglobin containing dried blood with the blood serum removed, to the comminuted ore feed to the oxidation zone, thereby attaining a substantially faster rate of oxidizing of the uranium values, and thereby obtaining a higher ultimate recovery of said values from said ores.

2. The process of claim 1 in which said small amount of catalyst is from 0.5 to 5.0 pounds per ton of dry comminuted ore.

3. Process according to claim 1 wherein the source of said blood is the cow.

4. Process according to claim 1 wherein the source of said blood is the sheep.

5. Process according to claim 1 wherein the source of said blood is the hog.

6. Process according to claim 1 wherein the source of said blood is the horse.

7. Process according to claim 1 wherein the source of said blood is the goat.

8. Process according to claim 1 wherein said oxidizing zone comprises a Pachuca tank.

9. Process according to claim 1 wherein said oxidizing zone comprises an autoclave.

10. Process according to claim 1 wherein said comminuted ore is coffinite.

11. Process according to claim 1 wherein said comminuted ore is carnotite.

12. Process according to claim 1 wherein said comminuted ore is uraninite.

13. The process of claim 8 in which said small amount of catalyst is from 0.5 to 5.0 pounds per ton of dry comminuted ore.

14. The process of claim 9 in which said small amount of catalyst is from 0.5 to 5.0 pounds per ton of dry comminuted ore.

15. The process of claim 10 in which said small amount of catalyst is from 0.5 to 5.0 pounds per ton of dry comminuted ore.

16. The process of claim 11 in which said small amount of catalyst is from 0.5 to 5.0 pounds per ton of dry comminuted ore.

17. The process of claim 12 in which said small amount of catalyst is from 0.5 to 5.0 pounds per ton of dry comminuted ore.

References Cited in the file of this patent

UNITED STATES PATENTS

| | | |
|---|---|---|
| 2,597,504 | Larsson | May 20, 1952 |
| 2,813,003 | Thunaes et al. | Nov. 12, 1957 |